(12) United States Patent
Narayanaswami et al.

(10) Patent No.: US 9,729,604 B2
(45) Date of Patent: *Aug. 8, 2017

(54) TAG AUTHENTICATION AND LOCATION VERIFICATION SERVICE

(71) Applicant: International Business Machines Corporation, Armonk, NY (US)

(72) Inventors: Chandrasekhar Narayanaswami, Wilton, CT (US); Umut Topkara, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/738,395

(22) Filed: Jan. 10, 2013

(65) Prior Publication Data

US 2014/0136652 A1 May 15, 2014

Related U.S. Application Data

(63) Continuation of application No. 13/675,376, filed on Nov. 13, 2012.

(51) Int. Cl.
*G06F 15/16* (2006.01)
*H04L 29/08* (2006.01)
(Continued)

(52) U.S. Cl.
CPC ............ *H04L 67/02* (2013.01); *H04W 4/008* (2013.01); *H04W 12/06* (2013.01);
(Continued)

(58) Field of Classification Search
CPC ....... H04L 47/70; H04L 47/827; H04L 41/04; H04L 41/08; H04L 41/50; H04L 63/10;
(Continued)

(56) References Cited

U.S. PATENT DOCUMENTS 7,062,455 B1 6/2006 Tobey
7,295,114 B1 * 11/2007 Drzaic .................. A62B 99/00
235/385

(Continued)

OTHER PUBLICATIONS

Narayanaswami et al., "Tag Authentication and Location Verification System," U.S. Appl. No. 13/675,376, filed Nov. 13, 2012, 48 pages.

(Continued)

*Primary Examiner* — Ryan Jakovac
*Assistant Examiner* — Da T Ton
(74) *Attorney, Agent, or Firm* — Yee & Associates, P.C.; Daniel P. Morris

(57) ABSTRACT

Verifying a location of a tag is provided. A request for content associated with the tag is received from a client device that scanned the tag. It is determined whether location data was received from the client device. In response to determining that the location data was received from the client device, it is determined whether a current location of the tag is a predefined location for the tag based on the location data received from the client device. In responsive to determining that the current location of the tag is the predefined location for the tag based on the location data received from the client device, the content associated with the tag is sent to the client device.

21 Claims, 10 Drawing Sheets

(51) Int. Cl.
*H04W 4/00* (2009.01)
*H04W 12/06* (2009.01)
H04L 29/06 (2006.01)
*H04W 4/02* (2009.01)
*H04W 12/10* (2009.01)

(52) U.S. Cl.
CPC ............. *H04L 63/107* (2013.01); *H04W 4/02* (2013.01); *H04W 12/10* (2013.01)

(58) Field of Classification Search
CPC . H04L 63/0407; H04L 67/32; H04L 67/1014; H04L 67/16; H04L 67/22; H04L 29/08; H04L 51/32; H04L 61/1523; G06F 11/327; H04W 24/10; H04W 40/12
USPC .................................. 709/217–219, 223–226
See application file for complete search history.

(56) References Cited

U.S. PATENT DOCUMENTS

| | | | |
|---|---|---|---|
| 7,957,833 B2 | 6/2011 | Beucher et al. | |
| 8,335,491 B1* | 12/2012 | Kovach | G06K 9/00577 235/383 |
| 9,208,293 B1* | 12/2015 | Zhu | G06F 21/35 |
| 2002/0008621 A1 | 1/2002 | Barritz et al. | |
| 2003/0210805 A1* | 11/2003 | Lofgren et al. | 382/100 |
| 2004/0047490 A1* | 3/2004 | McKinley et al. | 382/100 |
| 2004/0201676 A1* | 10/2004 | Needham | 348/207.1 |
| 2005/0111723 A1* | 5/2005 | Hannigan | G06Q 10/087 382/135 |
| 2006/0244566 A1* | 11/2006 | Sullivan | G06K 7/10336 340/10.1 |
| 2007/0162350 A1* | 7/2007 | Friedman | 705/26 |
| 2009/0031071 A1 | 1/2009 | Chiu | |
| 2009/0261948 A1* | 10/2009 | Ashizawa | 340/10.1 |
| 2009/0267768 A1* | 10/2009 | Fujiwara | G06F 17/30241 340/572.1 |
| 2010/0235508 A1* | 9/2010 | Weigand et al. | 709/225 |
| 2012/0095926 A1 | 4/2012 | Nishimura et al. | |
| 2012/0223131 A1* | 9/2012 | Lim | G06F 17/30879 235/375 |
| 2012/0290611 A1* | 11/2012 | Petrov | 707/770 |
| 2013/0047073 A1* | 2/2013 | Haubrich et al. | 715/234 |
| 2013/0104238 A1* | 4/2013 | Balsan et al. | 726/26 |
| 2014/0077944 A1* | 3/2014 | Baskin et al. | 340/539.1 |

OTHER PUBLICATIONS

Office action dated Sep. 25, 2014, regarding U.S. Appl. No. 13/675,376, 43 pages.
Office action dated Feb. 10, 2015, regarding U.S. Appl. No. 13/675,376, 40 pages.
Final Office Action, dated Jun. 26, 2015, regarding U.S. Appl. No. 13/675,376, 42 pages.
Office Action, dated Mar. 24, 2016, regarding U.S. Appl. No. 13/675,376, 48 pages.
Office Action, dated Sep. 27, 2016, regarding U.S. Appl. No. 13/675,376, 32 pages.
Notice of Allowance, dated Mar. 27, 2017, regarding U.S. Appl. No. 13/675,376, 17 pages.

* cited by examiner

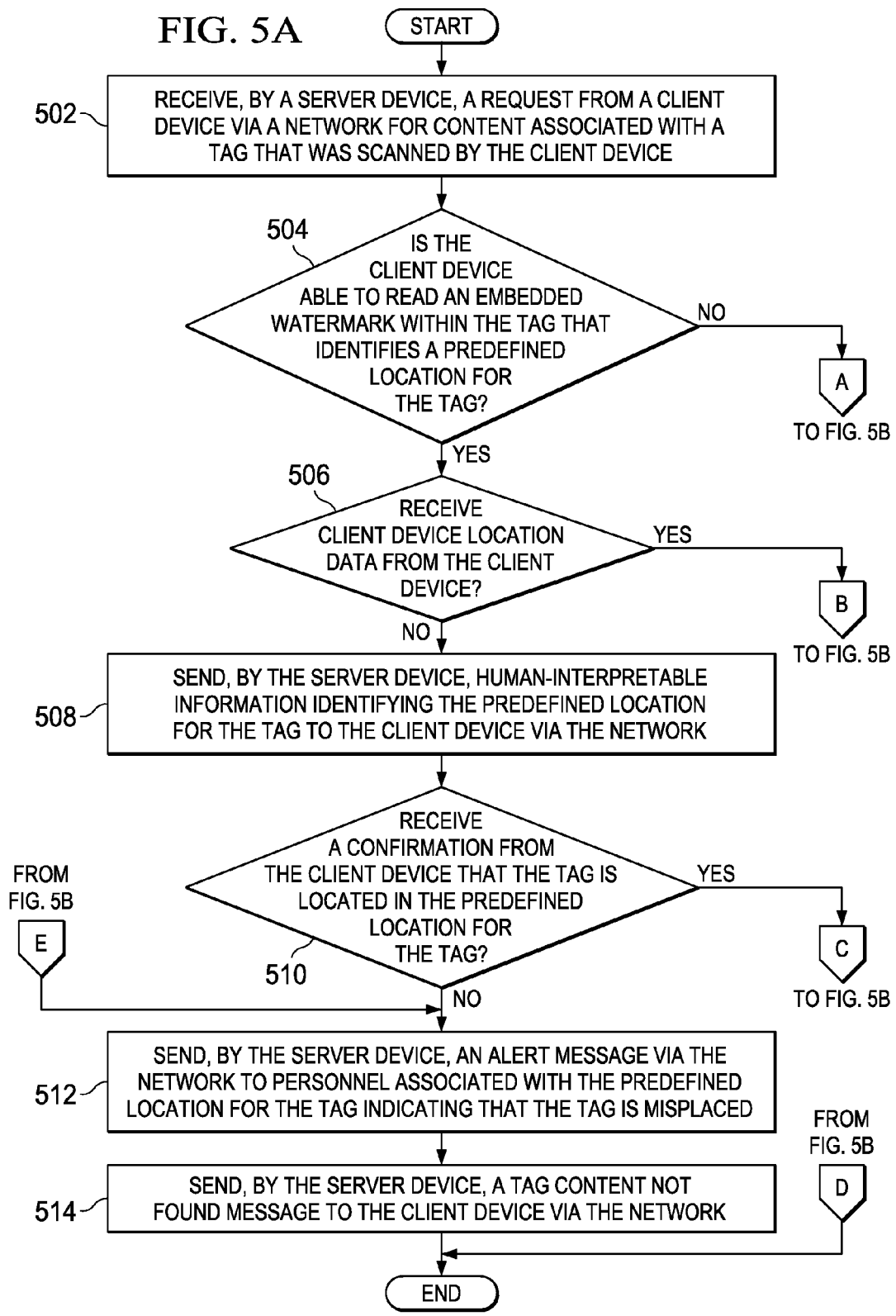

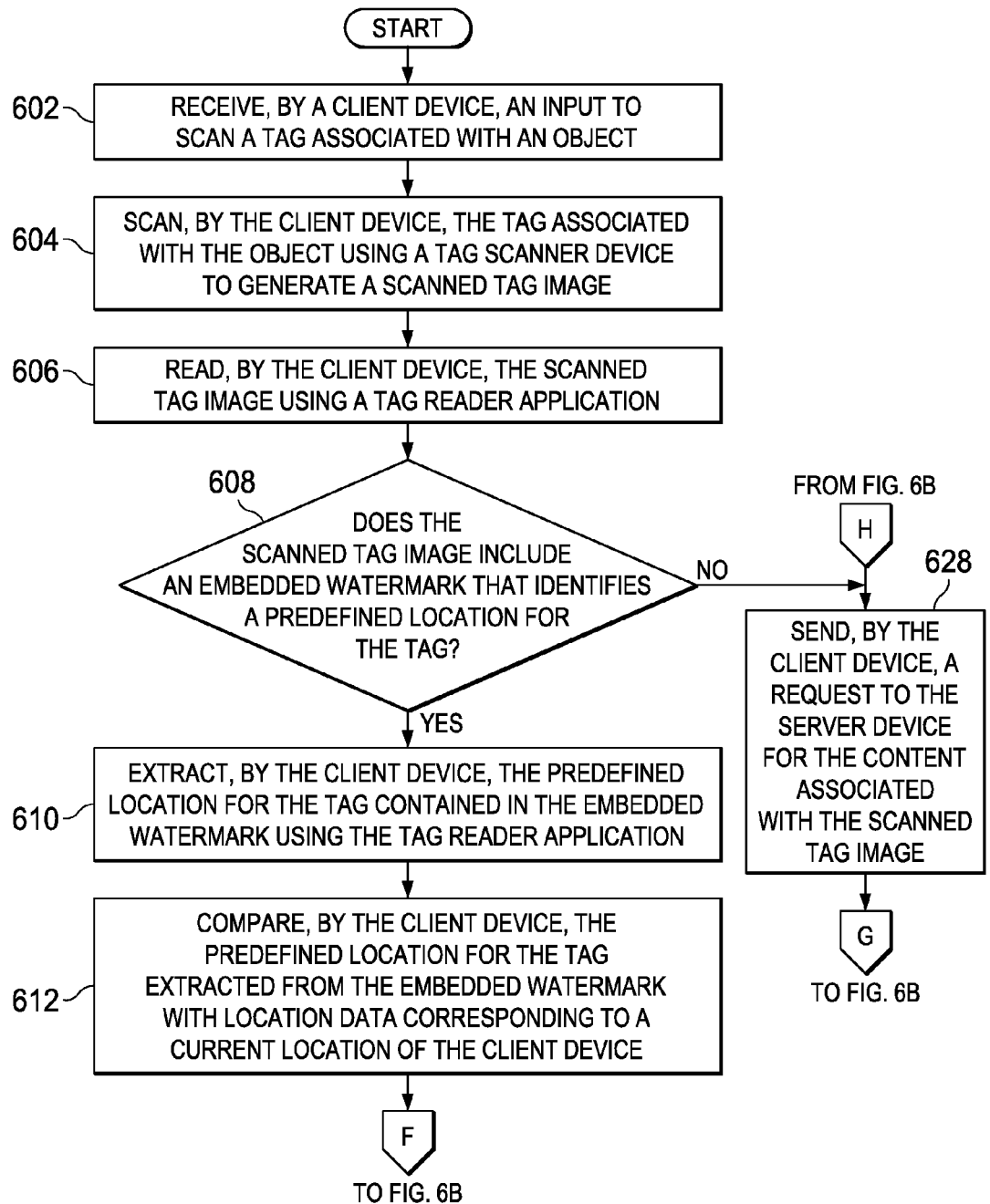

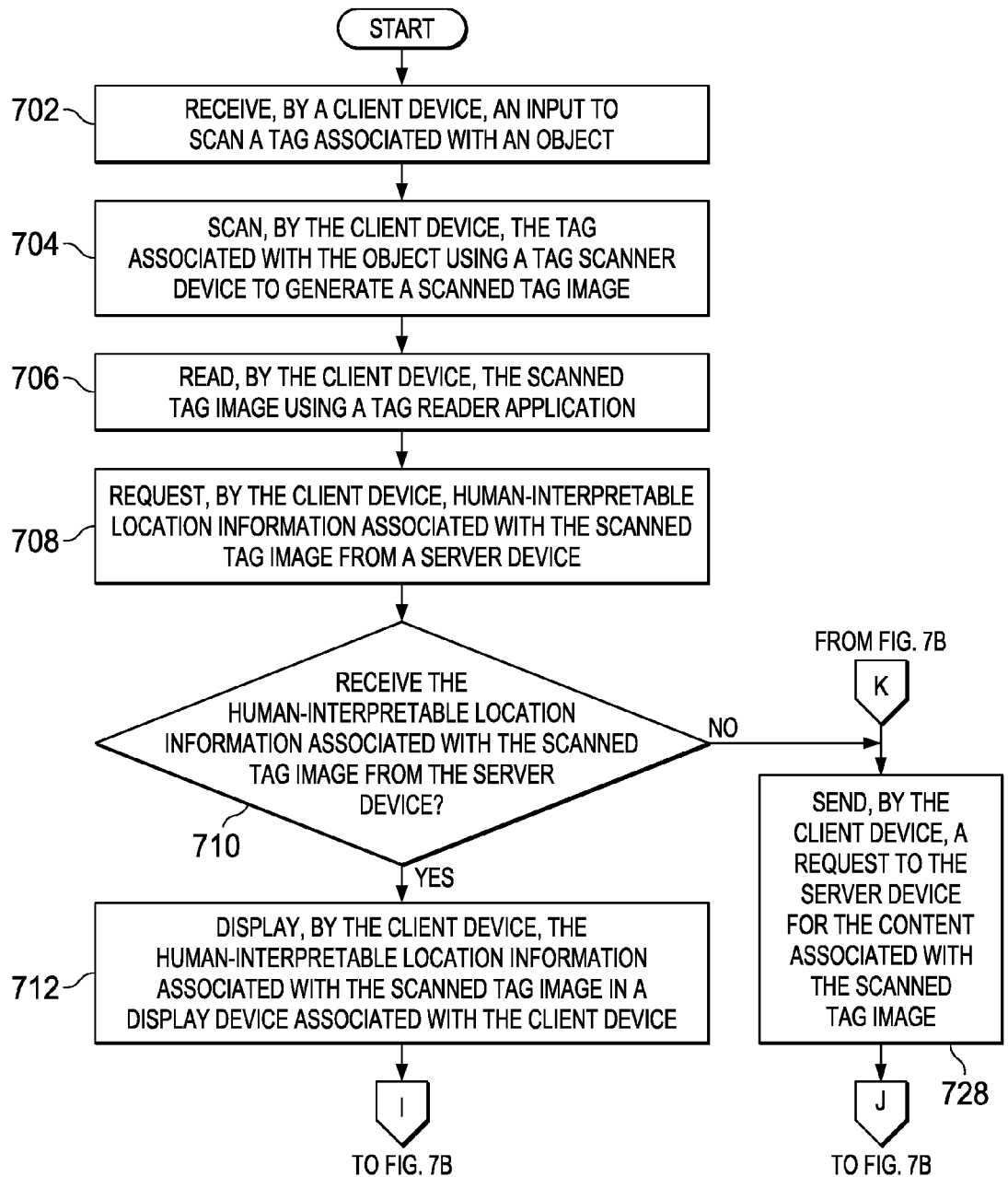

TAG AUTHENTICATION AND LOCATION VERIFICATION SERVICE

This application is a Continuation of and claims the benefit of priority to U.S. patent application Ser. No. 13/675,376, filed on Nov. 13, 2012 status pending entitled "TAG AUTHENTICATION AND LOCATION VERIFICATION SERVICE". The contents of which are hereby incorporated by reference.

BACKGROUND

1. Field

The disclosure relates generally to scanning machine-readable tags using portable tag scanning devices and more specifically to authenticating and verifying a location of a machine-readable tag scanned by a portable tag scanning device.

2. Description of the Related Art

Barcodes, which are one type of machine-readable tags, are typically attached to physical objects and contain useful digital information about the physical objects that the barcodes are attached to. One application of barcodes is to provide information regarding specific locations by affixing the barcodes to walls or fixed objects at the specific locations. The information content contained within the barcodes may be, for example, warnings, translations of posted signs, tourist information, directions, links to web pages, et cetera, which is meaningful to the particular location of the barcodes.

SUMMARY

According to one illustrative embodiment, a data processing system for verifying a location of a tag is provided. A request for content associated with the tag is received from a client device that scanned the tag. It is determined whether location data was received from the client device. In response to determining that the location data was received from the client device, it is determined whether a current location of the tag is a predefined location for the tag based on the location data received from the client device. In responsive to determining that the current location of the tag is the predefined location for the tag based on the location data received from the client device, the content associated with the tag is sent to the client device. According to another illustrative embodiment, a computer program product for verifying a location of a tag is provided.

BRIEF DESCRIPTION OF THE SEVERAL VIEWS OF THE DRAWINGS

FIG. 5A and FIG. 5B are a flowchart illustrating a process for a sever device in accordance with an illustrative embodiment;

FIG. 6A and FIG. 6B are a flowchart illustrating a process for a client device in accordance with an illustrative embodiment; and FIG. 7A and FIG. 7B are a flowchart illustrating an alternative process for a client device in accordance with an illustrative embodiment.

DETAILED DESCRIPTION

Figure 1:
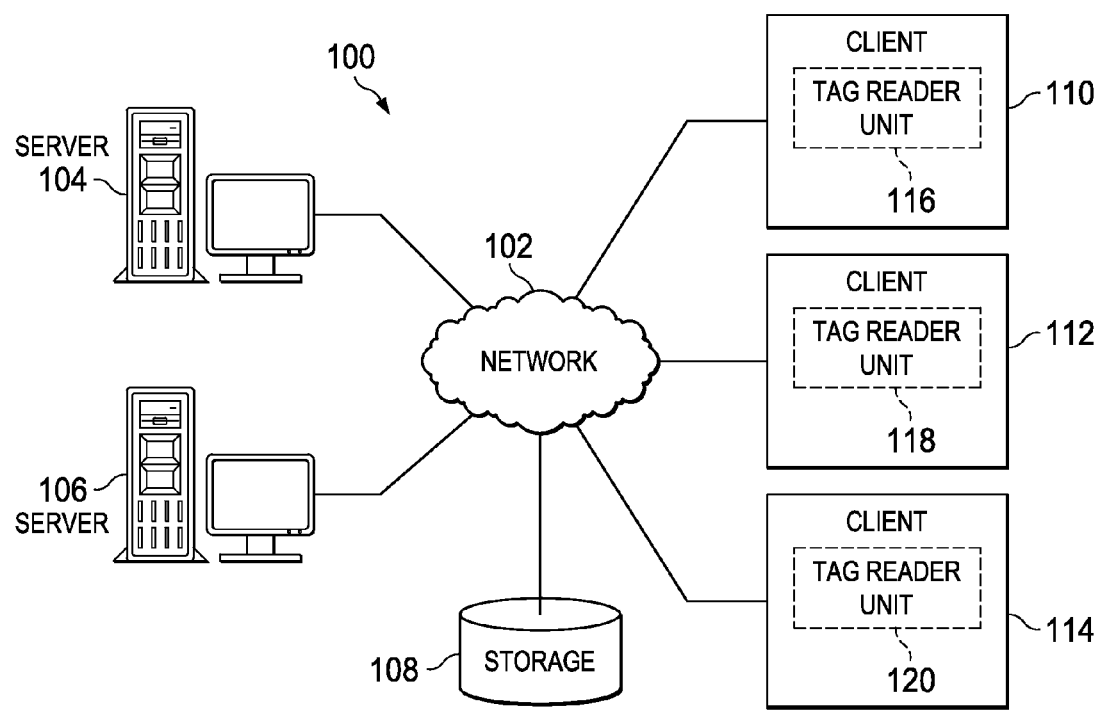
FIG. 1 is a pictorial representation of a network of data processing systems in which illustrative embodiments may be implemented.

As will be appreciated by one skilled in the art, aspects of the illustrative embodiments may be embodied as a data processing system or computer program product. Accordingly, aspects of the illustrative embodiments may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of data processing systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
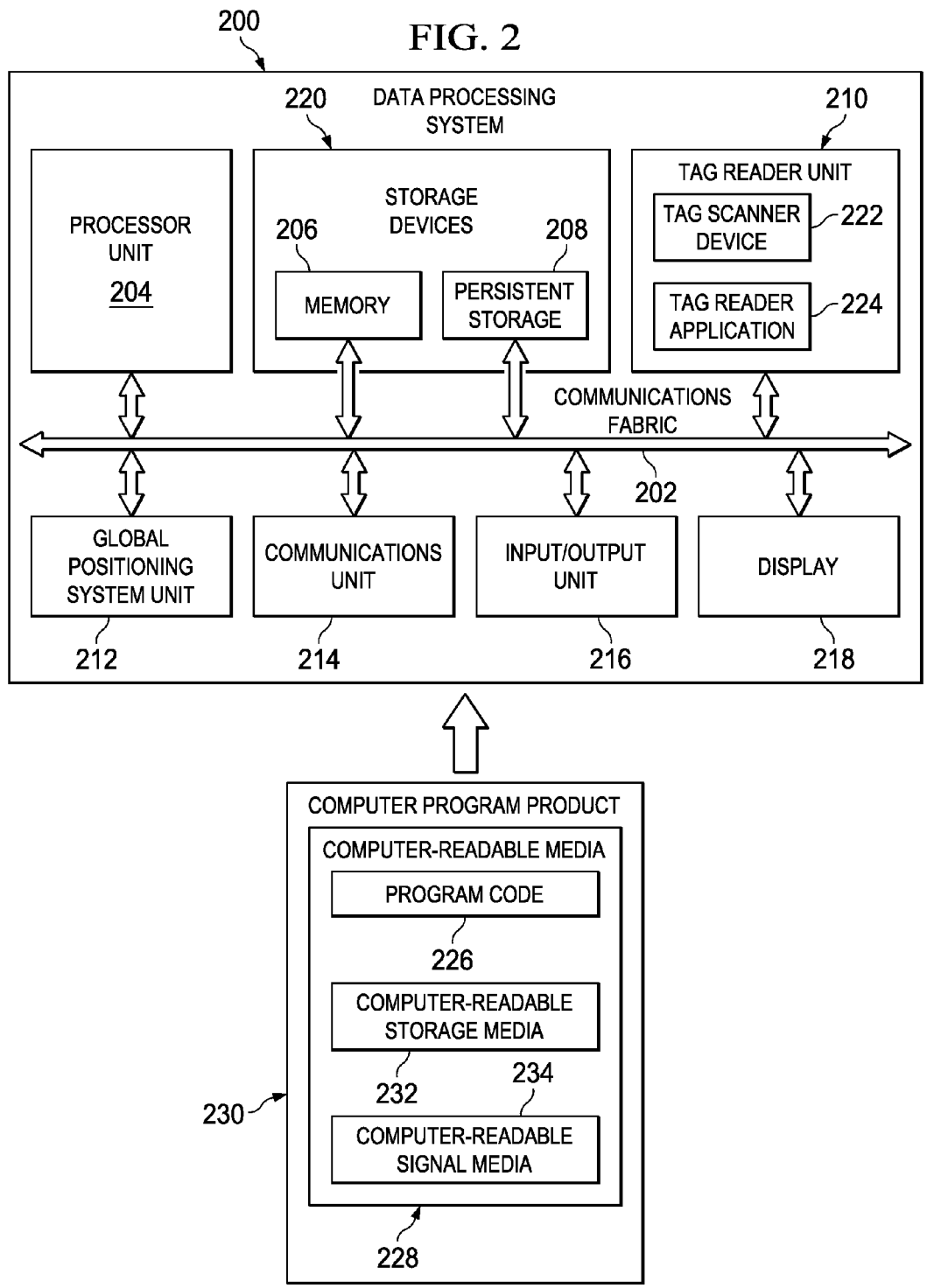
FIG. 2 is a diagram of a data processing system in which illustrative embodiments may be implemented.
Figure 3:
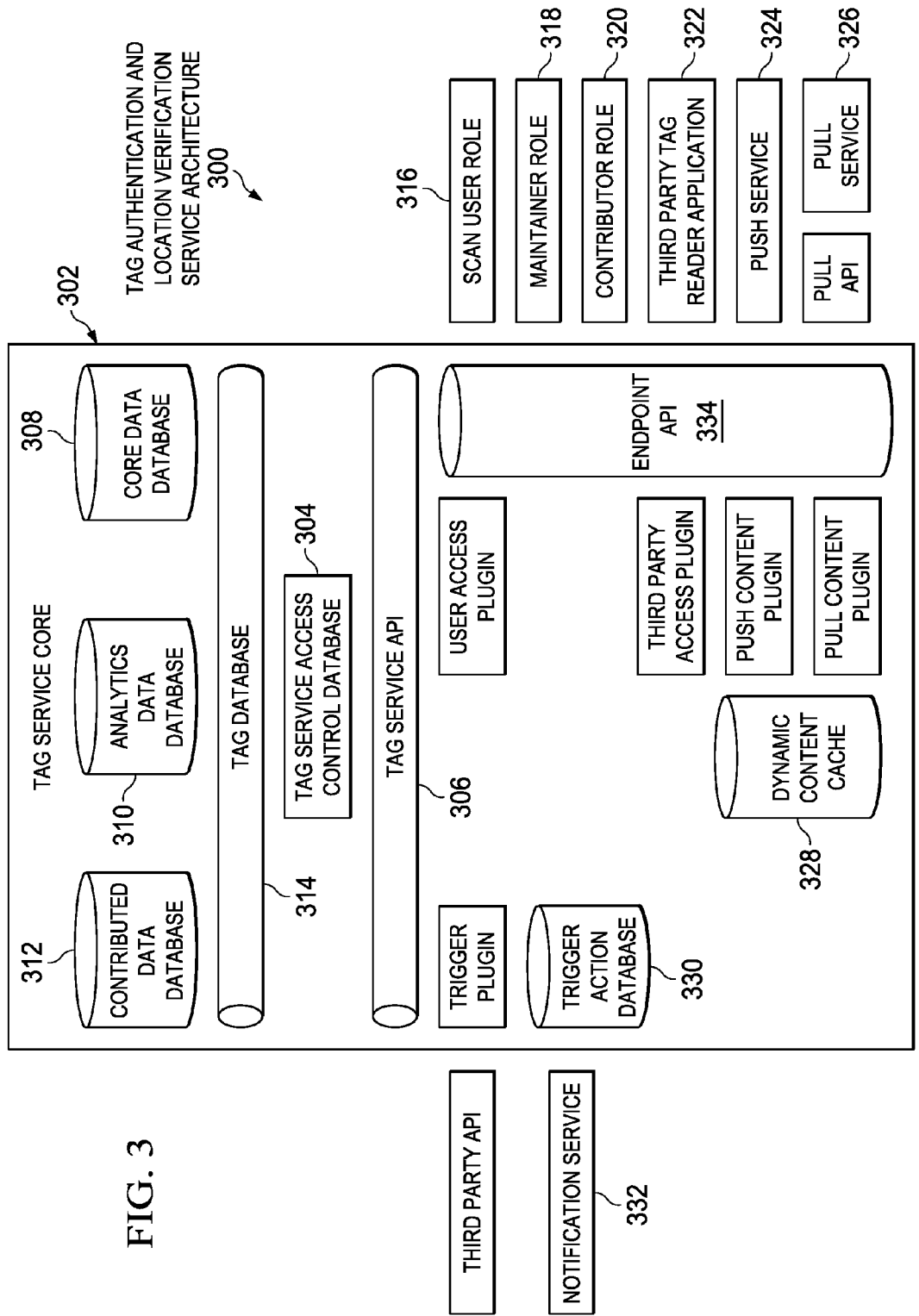
FIG. 3 is a diagram illustrating an example of a tag authentication and location verification service architecture in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire, wireless communication links, or fiber optic cables.

In the depicted example, server 104 and server 106 connect to network 102, along with storage unit 108. Server 104 and server 106 may be, for example, server computers with high speed connections to network 102. In addition, server 104 and/or server 106 may provide services for authenticating and verifying a location of a machine-readable tag scanned by a mobile client device connected to network 102.

Clients 110, 112, and 114 also connect to network 102. Clients 110, 112, and 114 are clients to server 104 and/or server 106. In the depicted example, server 104 and/or server 106 may provide information, such as boot files, operating system images, and applications to clients 110, 112, and 114.

Clients 110, 112, and 114 may be, for example, cellular telephones, smart phones, personal digital assistants, gaming devices, handheld computers, or any combination thereof, with wireless communication links to network 102. In this example, clients 110, 112, and 114 include a tag reader unit, such as tag reader units 116, 118, and 120. Tag reader units 116, 118, and 120 are capable of scanning and extracting digital data contained within a machine-readable tag. Tag reader units 116, 118, and 120 may be, for example, barcode scanners, quick response (QR) code scanners, radio frequency identification (RFID) scanners, near field communication (NFC) scanners, optical scanners, digital scanners, or any combination thereof. An optical scanner may be, for example, a camera located in a mobile communication device, such as a smart phone, which is capable of capturing still images and/or video images.

The machine-readable tag may be, for example, a barcode tag, a quick response code tag, a radio frequency identification tag, a near field communication tag, and the like. Machine-readable means that the tag is capable of being read by a scanner that corresponds to the particular type of tag being scanned. For example, a barcode scanner is capable of reading and interpreting the digital data contained within a barcode tag. The data contained within the machine-readable tag may be, for example, warnings regarding hazardous material or potential of electrical shock in an area, foreign language translations of posted signs, tourist information, directions to landmarks, public transportation schedules, uniform resource locators (URLs) to web pages that contain the desired information, and the like.

Also, the machine-readable tag may be affixed to or located near any type of object. An object may be, for example, a building, a landmark, a tourist attraction, a park, an area defined by a geometric shape, such as a square or a polygon, a posted sign, an electronic device, a painting, an article of merchandise, or a vehicle. An electronic device may be, for example, a computer, an automated teller machine, a kiosk, and the like. An article of merchandise may be, for example, food, clothing, furniture, hardware, or any other type of item offered for sale. A vehicle may be, for example, a passenger vehicle, such as a bus, a train, or a plain, which travels along a predefined route that includes predefined passenger embarking/disembarking locations on a predefined schedule.

Each of tag reader units 116, 118, and 120 may represent a set of one or more tag reader units coupled to clients 110, 112, and 114. Also, the set of tag reader units may be a combination of different types of tag reader units. For example, client device 110 may include an optical scanner and a radio frequency identification reader or any combination of different types of tag reader units.

As an illustrative example, a user of client 110 may utilize tag reader unit 116 to scan a quick response code tag attached to a sign located near a statue in a museum to obtain information regarding the statue. After scanning the quick response code tag, client 110 will send a request for the content associated with the quick response code tag (i.e., the information regarding the statue) to server 104 via network 102. In addition, client 110 may also send location data corresponding to a current location of client 110 to server 104. The location data may be, for example, global positioning system (GPS) coordinates of client 110 at the time when the quick response code tag was scanned by client 110.

Subsequent to receiving the location data corresponding to the current location of client 110, server 104 may verify that the location of the quick response code tag is a predefined location for the quick response tag. A predefined location for a tag is a site where the tag should be positioned based on a stored specification corresponding to the tag. Server 104 may verify that the location of the quick response code tag is a predefined location for the quick response tag by comparing a stored predefined location for the quick response tag with the global positioning system coordinates of client 110 at the time when the quick response code tag was scanned by client 110.

If the stored predefined location for the quick response tag is less than or equal to a threshold distance from the global positioning system coordinates of client 110 at the time when the quick response code tag was scanned, then the current location of the quick response code tag is the predefined location for the quick response tag. If the stored predefined location for the quick response tag is not less than or equal to a threshold distance from the global positioning system coordinates of client 110 at the time when the quick response code tag was scanned, then the current location of the quick response code tag is not the predefined location for the quick response tag and is assumed to be intentionally or unintentionally moved or misplaced. In response to verifying that the current location of the quick response code tag is the predefined location for the quick response code tag, server 104 may send the requested content associated with the quick response code tag to client 110. In response to determining that the current location of the quick response code tag is not the predefined location for the quick response code tag, server 104 may send an alert message to authorized personnel associated with the predefined location for the quick response code tag in order to correct the problem of the misplaced tag. Authorized personnel may be, for example, site managers or other maintenance personnel.

As another example, when client 110 scans a machine-readable tag that is affixed to a computer system or other similar data processing system, such as an automated teller machine (ATM), where entry of user credentials, such as user name, password, and bank card, are required to access services of the automated teller machine, server 104, by providing human-interpretable location information to the user of client 110 regarding the predefined location of the machine-readable tag affixed to the automated teller machine, may help to increase the confidence of the user that the automated teller machine is authentic before entering the user's credentials into the automated teller machine. As a result of verifying the location of the automated teller machine by scanning the affixed machine-readable tag, the user may prevent the loss of the user's credential information to a possible counterfeiter automated teller machine.

Further, the machine-readable tag affixed to the automated teller machine may include an encoded public key associated with a particular banking system digitally signed by the bank. Client 110 may use this public key extracted from the machine-readable tag to encrypt the user's credential information. Consequently, now only automated teller machines associated with that particular banking system having the corresponding private key may decrypt the user's credential information to prevent unauthorized hacking of the user's credentials.

Storage unit 108 is a network storage device capable of storing data in a structured or unstructured format. Storage unit 108 may provide, for example, storage of images of each machine-readable tag associated with the tag location verification service, a tag identification number for each machine-readable tag image, predefined locations corresponding to each tag identification number, content associated with each tag identification number, an expiration date associated with each tag identification number, human-interpretable information regarding the predefined locations corresponding to each tag identification number, machine-readable representations of the predefined locations corresponding to each tag identification number, a name of an entity that generated each machine-readable tag, a list of machine-readable tags that were scanned and were determined to be in an incorrect location or beyond an expiration date associated with the machine-readable tags, et cetera. The content associated with a tag identification number may be any type of information that describes an object that a machine-readable tag is affixed to or is located near or may be information that is somehow related to the object.

The human-interpretable information regarding the predefined locations corresponding to each tag identification number may be, for example, textual descriptions of where the machine-readable tags should be located, verbal descriptions of where the machine-readable tags should be located, a graphical depiction, such as a floor plan or map, of where the machine-readable tags should be located, a picture of where the machine-readable tags should be located, or a video of where the machine-readable tags should be located. The human-interpretable information regarding the predefined locations corresponding to each tag identification number may be, for example, used by users of client devices to verify that the current location of a machine-readable tag is actually located at the predefined location for the machine-readable tag when global positioning system coordinates of a client device are not available. Also, it should be noted that illustrative embodiments may generate the human-interpretable information regarding the predefined locations corresponding to each tag identification number from the machine-readable representations of the predefined locations corresponding to each tag identification number. The machine-readable representations may be, for example, computer-aided design data representing the predefined locations corresponding to each tag identification number. Illustrative embodiments convert the machine-readable representations into the human-interpretable location information using, for example, two dimensional or three dimensional image rendering processes. In addition, illustrative embodiments may generate the human-interpretable location information from the machine-readable representations using text generation processes and/or speech synthesis processes.

Furthermore, storage unit 108 may store other data, such as security information that may include user names, passwords, and/or biometric data associated with system administrators and other authorized users of the tag authentication and location verification service for controlled access to the service. Moreover, it should be noted that network data processing system 100 may include any number of additional server devices, client devices, and other devices not shown.

Program code located in network data processing system 100 may be stored on a computer recordable storage medium and downloaded to a computer or other device for use. For example, program code may be stored on a computer recordable storage medium on server 106 and downloaded to client 114 over network 102 for use on client 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, tag reader unit 210, global positioning system unit 212, communications unit 214, input/output (I/O) unit 216, and display 218.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 220. A computer readable storage device is any piece of hardware that is capable of storing information, such as, for example, without limitation, data, computer readable program code in functional form, and/or other suitable information either on a transient basis and/or a persistent basis. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Tag reader unit 210 is capable of scanning and extracting digital data contained within a machine-readable tag. In other words, a user of data processing system 200 may utilize tag reader unit 210 to scan a machine-readable tag. Tag reader unit 210 includes tag scanner device 222 and tag reader application 224. Tag scanner device 210 may be, for example, a barcode scanner, a quick response code scanner, a radio frequency identification scanner, a near field communication scanner, an optical scanner, or a digital scanner. An optical scanner may be, for example, a camera, which is capable of capturing still images and/or video images, located in data processing system 200.

Tag reader application 224 is a customized software program that is capable of not only reading a "normal" payload of a machine-readable tag, but also is capable of reading data contained within an embedded watermark of the machine-readable tag. The embedded watermark may include supplemental data, such as, for example, an identification number of the machine-readable tag and a predefined location for the machine-readable tag. Further, tag reader application 224 is capable of reading a digital signature that may be contained within the machine-readable tag to verify a machine-readable tag's authenticity. In other words, tag reader application 224 is able to determine whether the machine-readable tag was generated by an authorized entity or whether the machine-readable tag is a counterfeit tag. Furthermore, the embedded watermark may also include a digital signature to verify the embedded watermark's authenticity.

Global positioning system unit 212 is a transceiver device that is capable of receiving and sending global positioning system coordinates associated with a current location of data processing system 200. However, it should be noted that in alternative illustrative embodiments, global positioning system unit 212 may not be present or may be present, but not activated.

Communications unit 214, in this example, provides for communication with other data processing systems or devices. Communications unit 214 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 216 allows for the input and output of data with other devices that may be connected to data processing system 200. For example, input/output unit 216 may provide a connection for user input through a keypad, a keyboard, a mouse, and/or some other suitable input device. Display 218 provides a mechanism to display information to a user.

Instructions for the operating system, applications, and/or programs may be located in storage devices 220, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 226 is located in a functional form on computer readable media 228 that is selectively removable and may be loaded onto or transferred to data processing system 200 for running by processor unit 204. Program code 226 and computer readable media 228 form computer program product 230. In one example, computer readable media 228 may be computer readable storage media 232 or computer readable signal media 234. Computer readable storage media 232 may include, for example, an optical or magnetic disc that is inserted or placed into a drive or other device that is part of persistent storage 208 for transfer onto a storage device, such as a hard drive, that is part of persistent storage 208. Computer readable storage media 232 also may take the form of a persistent storage, such as a hard drive, a thumb drive, or a flash memory that is connected to data processing system 200. In some instances, computer readable storage media 232 may not be removable from data processing system 200.

Alternatively, program code 218 may be transferred to data processing system 200 using computer readable signal media 234. Computer readable signal media 234 may be, for example, a propagated data signal containing program code 226. For example, computer readable signal media 234 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 226 may be downloaded over a network to persistent storage 208 from another device or data processing system through computer readable signal media 234 for use within data processing system 200. For instance, program code stored in a computer readable storage media in a server data processing system may be downloaded over a network from the server to data processing system 200. The data processing system providing program code 226 may be a server computer, a client computer, or some other device capable of storing and transmitting program code 226.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 232 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that machine-readable tags may be maliciously moved or replaced with a counterfeit tag or may be inadvertently moved. Also, machine-readable tags may become un-scannable as a result of vandalism or weathering. Consequently, problems or harm may occur to people when machine-readable tags that include vital information, such as warnings or sign translations, somehow become misplaced, replaced, or un-scannable. In addition, a payload of a machine-readable tag may include out-of-date information. As a result, visual pollution may occur due to a lack of regular cleanup of expired machine-readable tags.

Illustrative embodiments provide a service for updating, authenticating, and maintaining machine-readable tags and their associated content or information. In addition, illustrative embodiments provide for verifying the locations of the machine-readable tags scanned by users of the service, either through an automatic process or by utilizing a user feedback process. The automatic process may verify a current location of a machine-readable tag as the correct location for the machine-readable tag by comparing a stored correct location for the machine-readable tag with global positioning system coordinates received from a client device that just scanned the machine-readable tag. The user feedback process may provide a user with human-interpretable location information, such as, for example, textual and/or verbal descriptions of where the machine-readable tag is supposed to be located, and then wait to receive user feedback as to whether the provided human-interpretable location information matches the currently observed location of the machine-readable tag by the user. Further, illustrative embodiments provide a way to embed the predefined location for a machine-readable tag in the machine-readable tag as a watermark, so that customized tag reader applications may read and extract the predefined tag location information, while standard tag reader applications may only read the "normal" payload of the machine-readable tag. Furthermore, illustrative embodiments provide for machine-readable tag authentication by digitally signing the machine-readable tags associated with the tag authentication and location verification service.

Thus, illustrative embodiments provide a data processing system and a computer program product for verifying a location of a machine-readable tag. A request for content associated with the tag is received from a client device that scanned the tag. It is determined whether location data was received from the client device. In response determining that the location data was received from the client device, it is determined whether a current location of the tag is a predefined location for the tag based on the location data received from the client device. In responsive to determining that the current location of the tag is the predefined location for the tag based on the location data received from the client device, the content associated with the tag is sent to the client device.

With reference now to FIG. 3, a diagram illustrating an example of a tag authentication and location verification service architecture is depicted in accordance with an illustrative embodiment. Tag authentication and location verification service architecture 300 may be implemented in a network of data processing systems, such as network data processing system 100 in FIG. 1. Alternatively, tag authentication and location verification service architecture 300 may be implemented in a single data processing system, such as server 104 or client 110 in FIG. 1.

Tag authentication and location verification service architecture 300 responds to requests for content associated with scanned machine-readable tags from both customized tag scanners and standard tag scanners. A customized tag scanner is capable of not only scanning and interpreting a normal payload of a machine-readable tag, such as a uniform resource locator corresponding to a web page containing the content associated with the scanned machine-readable tag, but also scanning and interpreting an embedded watermark, which includes supplemental data, and a digital signature, which is used for authentication, that may also be included within a machine-readable tag. In contrast, a standard tag scanner is only capable of scanning and interpreting the normal payload of a machine-readable tag. However, it should be noted that tag authentication and location verification service architecture 300 will not respond to requests for content associated with scanned machine-readable tags when tag authentication and location verification service architecture 300 determines that a machine-readable tag is not in the predefined location for the machine-readable tag or when tag authentication and location verification service architecture 300 determines that a machine-readable tag is expired.

Tag authentication and location verification service architecture 300 verifies a current location of a scanned machine-readable tag by using global positioning system coordinates of a mobile client device that scanned the machine-readable tag. Alternatively, tag authentication and location verification service architecture 300 may utilize user feedback to verify that the current location of the scanned machine-readable tag is the predefined location for the machine-readable tag by providing textual descriptions, verbal descriptions, graphical depictions, and/or photographs or videos of the predefined location for the machine-readable tag to the mobile client device that scanned the machine-readable tag. In addition, tag authentication and location verification service architecture 300 determines that a machine-readable tag is expired by comparing a current date with a stored expiration date associated with the machine-readable tag.

Tag authentication and location verification service architecture 300 includes a set of core components that provide the core capabilities, such as machine-readable tag database lookups, updates, and access control. Further, tag authentication and location verification service architecture 300 includes a core service application programming interface that allows other components of tag authentication and location verification service architecture 300 to access the core capabilities. Access to the core capabilities may be customized through plug-in components with respect to different information sources that push data into the core components or pull data from the core components. Tag authentication and location verification service architecture 300 is exposed to client devices with machine-readable tag scanners, push data services, and other data sources through an endpoint application programming interface, such as endpoint application programming interface (API) 334.

Tag authentication and location verification service architecture 300 includes tag service core 302, tag service access control database 304, and tag service application programming interface (API) 306. Tag service core 302 includes core data database 308, analytics data database 310, contributed data database 312, and tag database 314. Core data database 308 may store, for example, information regarding each of the machine-readable tags, such as when a machine-readable tag was generated, who generated the machine-readable tag, a unique identification number associated with the machine-readable tag, an expiration date associated with the machine-readable tag, a predefined location for the machine-readable tag, descriptions and/or photographs of the predefined location for the machine-readable tag, and the like. Analytics data database 310 may store, for example, information regarding when a machine-readable tag was scanned by a client device, which client device scanned the machine-readable tag, when a machine-readable tag was reprinted to replace a machine-readable tag that was determined to be misplaced or damaged, and the like. Contributed data database 312 may store, for example, information that was contributed to tag authentication and location verification service architecture 300 by other sources, such as foreign language translations of signs, links or uniform resource locators to web sites containing information related to a machine-readable tag, and the like. Tag database 314 may store, for example, images of each machine-readable tag, along with embedded watermarks and/or digital signatures associated with the machine-readable tags.

Tag service access control database 304 mediates access to the core components of tag authentication and location verification service architecture 300. In other words, tag service access control database 304 determines a set of entities that may access and modify the core components. Tag service access control database 304 may store, for example, security information, such as user names, passwords, and/or biometric data associated with system administrators and other authorized users of tag authentication and location verification service architecture 300 for secure and controlled access to service architecture 300. Tag service application programming interface 306 isolates different types of plug-ins, which may be user-contributed or custom-built plug-in components, to help provide access to the core components by third party services or by different types of end users.

In addition, tag authentication and location verification service architecture 300 identifies three different user roles, such as scan user role 316, maintainer role 318, and contributor role 320. Scan user role 316 is a user of a mobile client device who wants to access content associated with a machine-readable tag using either a third party machine-readable tag scanning application, such as third party tag reader application 322, or a customized machine-readable tag scanning application, such as tag reader application 224 in FIG. 2, located on the user's mobile client device. Maintainer role 318 is a person, such as a site manager, who is responsible for maintaining the correctness, timeliness, and location of machine-readable tags at a particular site. Contributor role 320 is a person who may contribute to the content associated with a particular machine-readable tag, such as a translation of sign to a foreign language, which is accessible by the scanning of that particular machine-readable tag.

Push service 324 receives content, such as alerts and news updates, sent by outside data service providers to tag authentication and location verification service architecture 300. Pull service 326 pulls content that is regularly updated, such as weather reports and traffic reports, from the outside data service providers. Dynamic content cache 328 may store, for example, the content from the outside data service providers, such as the alerts, news updates, weather reports, and traffic reports. Further, information about events that occur on tag authentication and location verification service architecture 300 may be provided to third parties. For example, triggers may be setup to send information to a particular third party when a particular event occurs, such as when a particular machine-readable tag is scanned or when a machine-readable tag scanned at a particular site is determined to be damaged or misplaced. Trigger action database 330 may store the triggers, for example. Further, tag authentication and location verification service architecture 300 may use notification service 332 to alert a particular third party when a particular trigger event occurs in tag authentication and location verification service architecture 300.

Figure 4:
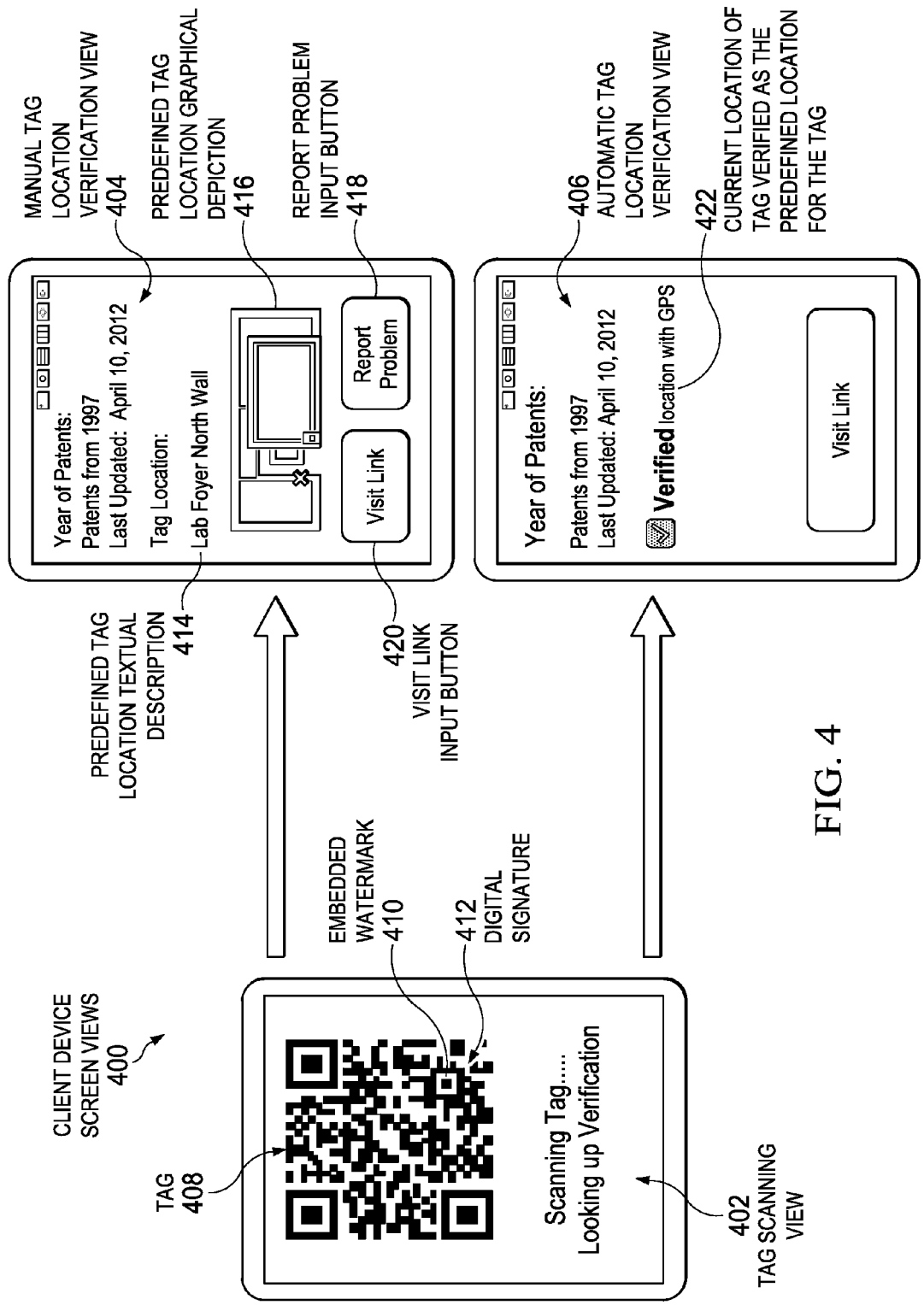
FIG. 4 is a diagram illustrating examples of client device screen views in accordance with an illustrative embodiment.

With reference now to FIG. 4, a diagram illustrating examples of client device screen views is depicted in accordance with an illustrative embodiment. Client device screen views 400 may be displayed within a display device, such as display 218 in FIG. 2, of a client device, such as client 110 in FIG. 1. Client device screen views 400 includes tag scanning view 402, manual tag location verification view 404, and automatic tag location verification view 406.

Tag scanning view 402 illustrates when a user of the client device scans tag 408. Tag 408 is a machine-readable tag that includes embedded watermark 410 and digital signature 412. Embedded watermark 410 may include information, such as an identification number of tag 408 and data regarding a predefined location for tag 408, in addition to the normal payload of tag 408. Digital signature 412 is used to verify that tag 408 is authentic and not a counterfeit tag.

A tag authentication and location verification service sends manual tag location verification view 404 to the client device when the tag authentication and location verification service utilizes a user feedback process to verify that the current location of tag 408 is the predefined location for tag 408. Manual tag location verification view 404 includes predefined tag location textual description 414 and predefined tag location graphical depiction 416. Predefined tag location textual description 414 describes the predefined location for tag 408 in a text format, such as "Lab Foyer North Wall". Predefined tag location graphical depiction 416 illustrates the predefined location for tag 408 in a graphic, such as a floor plan.

Manual tag location verification view 404 also includes report problem input button 418 and visit link input button 420. In this example, report problem input button 418 and visit link input button 420 are graphic icons. However, it should be noted that report problem input button 418 and visit link input button 420 may be provided in another format, such as in a drop down menu list. The user of the client device uses report problem input button 418 to report that tag 408 is misplaced or damaged. Alternatively, the user of the client device may use report problem input button 418 to verify that the current location of tag 408 is the predefined location for tag 408 based on predefined tag location textual description 414 and predefined tag location graphical depiction 416. In addition, the user of the client device may visit the web site containing the content associated with tag 408 by using visit link input button 420.

In an alternative illustrative embodiment, the tag authentication and location verification service sends automatic tag location verification view 406 to the client device when the tag authentication and location verification service utilizes an automatic process to verify that the current location of tag 408 is the predefined location for tag 408. When using the automatic process, the tag authentication and location verification service utilizes the global positioning system coordinates of the client device to verify that the current location of tag 408 is the predefined location for tag 408. In this example, automatic tag location verification view 406 reads "Verified location with GPS" at current location of tag verified as the predefined location for the tag 422.

Figure 5B:
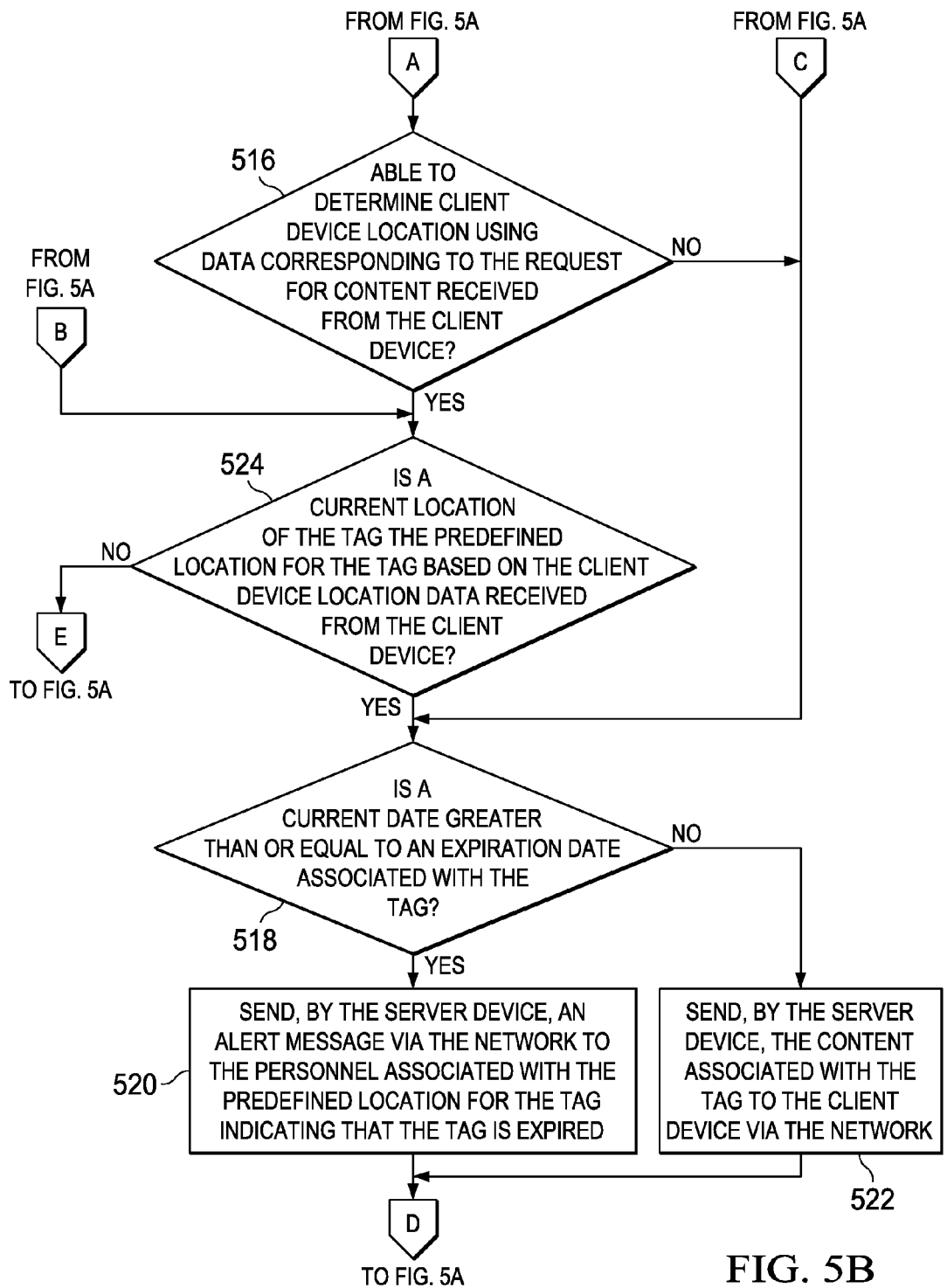

With reference now to FIG. 5A and FIG. 5B, a flowchart illustrating a process for a server device is shown in accordance with an illustrative embodiment. The process shown in FIGS. 5A and 5B may be implemented in a server device, such as, for example, server device 104 in FIG. 1. In addition, the server device may be implemented in a data processing system, such as data processing system 200 in FIG. 2. However, it should be noted that the server device may not include a tag reader unit and global positioning system unit, such as tag reader unit 210 and global positioning system unit 212 in FIG. 2.

The process begins when the server device receives a request from a client device via a network, such as client device 110 via network 102 in FIG. 1, for content associated with a tag that was scanned by the client device (step 502). The tag scanned by the client device may be, for example, tag 408 in FIG. 4. After receiving the request for the content associated with the tag in step 502, the server device makes a determination as to whether the client device is able to read an embedded watermark, such as embedded watermark 410 in FIG. 4, within the tag that identifies a predefined location for the tag (step 504).

If the server device determines that the client device is able to read the embedded watermark within the tag, yes output of step 504, then the server device makes a determination as to whether the server device received client device location data from the client device (step 506). If the server device determines that the server device did not receive the client device location data from the client device, no output of step 506, then the server device sends human-interpretable information identifying the predefined location for the tag to the client device via the network (step 508). The human-interpretable information identifying the predefined location for the tag may be, for example, a textual description of the predefined location for the tag, a verbal description of the predefined location for the tag, a picture showing the predefined location for the tag, and/or a graphic illustration depicting the predefined location for the tag. In addition, the server device may generate the human-interpretable location information from machine-readable representations of the predefined location for the tag, such as computer-aided design data corresponding to the predefined location for the tag. Alternatively, personnel associated with the predefined location for the tag may generate the human-interpretable location information by taking a picture or video of the defined location for the tag or by making a graphic depiction or other type of illustration showing the predefined location for the tag.

Subsequent to sending the human-interpretable information identifying the predefined location for the tag to the client device in step 508, the server device makes a determination as to whether the server device received a confirmation from the client device indicating that the tag is located in the predefined location for the tag (step 510). If the server device determines that the server device did not receive a confirmation from the client device indicating that the tag is located in the predefined location for the tag, no output of step 510, then the server device sends an alert message via the network to personnel associated with the predefined location for the tag indicating that the tag is misplaced (step 512). In addition, the server device sends a tag content not found message to the client device via the network (step 514).

Returning again to step 504, if the server device determines that the client device is not able to read the embedded watermark within the tag, no output of step 504, then the server device makes a determination as to whether the server device is able to determine client device location using data corresponding to the request for content received from the client device (step 516). The data corresponding to the request for content received from the client device may be, for example, information, such as location of the client device within a network, included within one or more headers of the content request message. If the server device determines that the server device is not able to determine the client device location using data corresponding to the request for content received from the client device, no output of step 516, then the server device makes a determination as to whether a current date is greater than or equal to an expiration date associated with the tag (step 518).

If the server device determines that the current date is greater than or equal to the expiration date associated with the tag, yes output of step 518, then the server device sends an alert message via the network to the personnel associated with the predefined location for the tag indicating that the tag is expired (step 520) and the process terminates thereafter. If the server device determines that the current date is not greater than or equal to the expiration date associated with the tag, no output of step 518, then the server device sends the content associated with the tag to the client device via the network (step 522) and the process terminates thereafter.

Returning again to step 516, if the server device determines that the server device is able to determine the client device location using data corresponding to the request for content received from the client device, yes output of step 516, then the server device makes a determination as to whether a current location of the tag is the predefined location for the tag based on the client device location data received from the client device (step 524). If the server device determines that the current location of the tag is not the predefined location for the tag based on the client device location data received from the client device, no output of step 524, then the process returns to step 512 where the server device sends an alert message to the personnel associated with the predefined location for the tag. If the server device determines that the current location of the tag is the predefined location for the tag based on the client device location data received from the client device, yes output of step 524, then the process returns to step 518 where the server device determines whether the current date is greater than or equal to the expiration date associated with the tag.

Figure 6B:
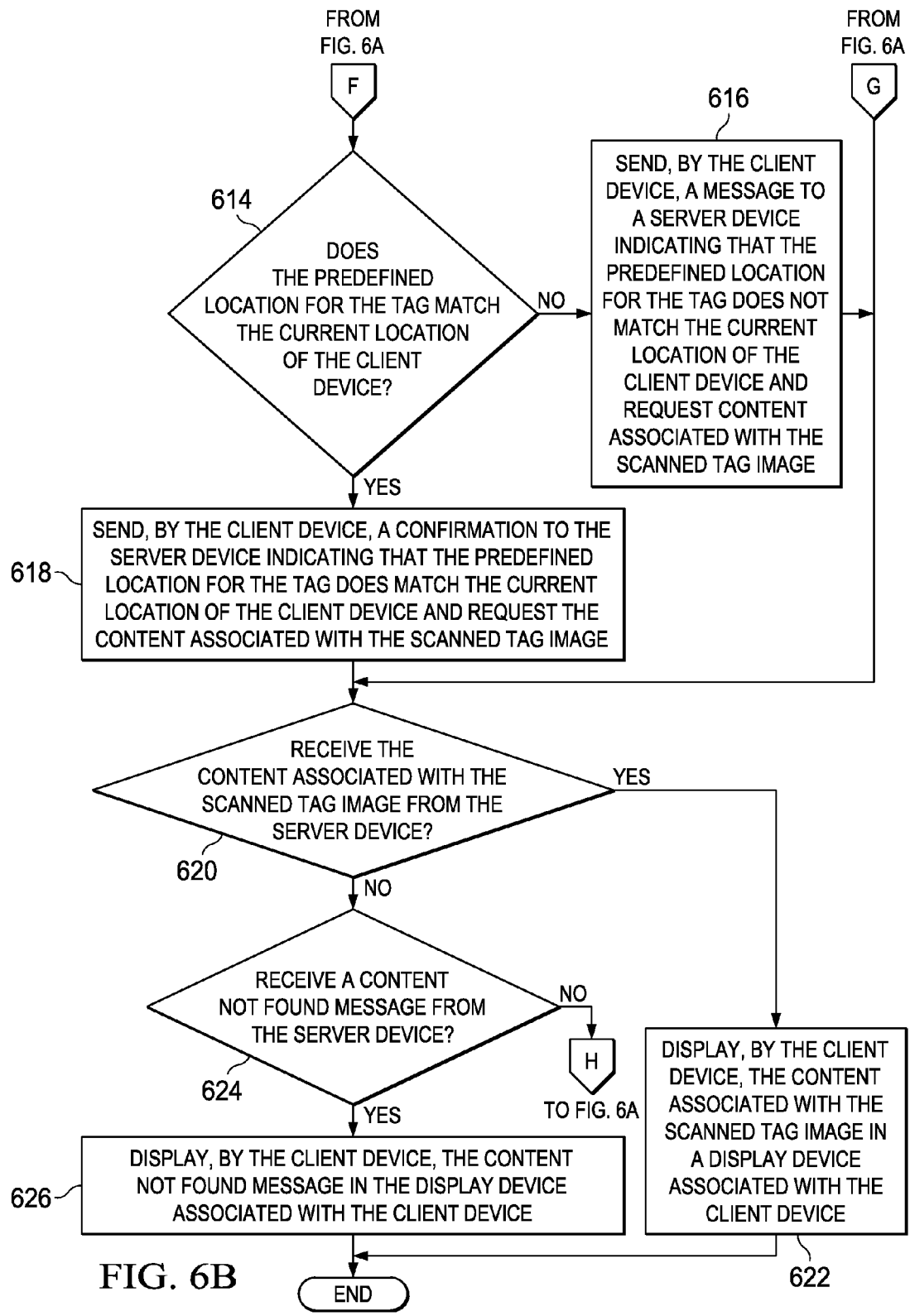

With reference now to FIG. 6A and FIG. 6B, a flowchart illustrating a process for a client device is shown in accordance with an illustrative embodiment. The process shown in FIGS. 6A and 6B may be implemented in a client device, such as, for example, client device 110 in FIG. 1. Also, the client device may be implemented in a data processing system, such as data processing system 200 in FIG. 2.

The process begins when the client device receives an input to scan a tag associated with an object (step 602). The tag may be, for example, tag 408 in FIG. 4. The tag is a machine-readable tag and may be, for example, a barcode tag, a quick response (QR) code tag, a radio frequency identification (RFID) tag, a near field communication (NFC) tag, or the like. Machine-readable means that the tag is capable of being read by a scanner device corresponding to the particular type of tag being scanned. For example, a barcode tag is capable to being read and interpreted by a barcode scanner device. The tag is affixed to or located near the object. Also, the tag provides digital information about the object the tag is affixed to or located near. Further, the tag may be digitally signed, such as digital signature 412 in FIG. 4, by an authorized provider of the tag for tag authentication. Furthermore, the tag may include an embedded watermark, such as embedded watermark 410 in FIG. 4, in addition to the digital signature of the tag provider. The embedded watermark may include data, such as the predefined location of the tag within a particular area, a unique identification number corresponding to the tag, and an expiration date associated with the tag, in addition to the normal payload of the tag. Also, the embedded watermark may include a digital signature for authentication. The normal payload of the tag may be, for example, a uniform resource locator (URL) to a web page that contains the desired information regarding the object to which the tag is affixed to or located near. Also, it should be noted that only client devices equipped with customized tag reader applications of illustrative embodiments are capable of reading and extracting the data contained within the embedded watermark of the tag and the digital signatures. In other words, scanning devices not equipped with a customized tag reader application, such as tag reader application 224 in FIG. 2, will only be able to read the normal payload of a tag, such as the URL, and not be able to read the embedded watermark data or the digital signatures.

An object that a tag may be affixed to or located near may be, for example, a building, a landmark, a sign, an electronic device, a painting, or a vehicle. An electronic device may be, for example, a computer, an automated teller machine, a kiosk, and the like. A vehicle may be, for example, a passenger vehicle, such as a bus, a train, or a plain, which travels along a predefined route that includes predefined passenger embarking/disembarking locations on a predefined schedule.

After receiving the input to scan the tag associated with the object in step 602, the client device scans the tag associated with the object using a tag scanner device to generate a scanned tag image (step 604). The tag scanner device may be, for example, tag scanner device 220 in FIG. 2. Also, the tag scanner device may be, for example, a barcode scanner, a quick response code scanner, a radio frequency identification scanner, a near field communication scanner, an optical scanner, or a digital scanner. An optical scanner may be, for example, a camera associated with a mobile communication device, such as a cellular telephone, which is capable of capturing still images and/or video images.

Subsequently, the client device reads the scanned tag image using the tag reader application (step 606). Further, the client device makes a determination as to whether the scanned tag image includes an embedded watermark that identifies a predefined location for the tag (step 608). If the client device determines that the scanned tag image does include an embedded watermark that identifies a predefined location for the tag, yes output of step 608, then the client device extracts the predefined location for the tag contained in the embedded watermark using the tag reader application (step 610). Furthermore, the client device compares the predefined location for the tag extracted from the embedded watermark with location data corresponding to a current location of the client device (step 612). The location data corresponding to the current location of the client device may be, for example, global positioning system (GPS) coordinates obtained from a GPS transceiver device located within the client device, such as global positioning system unit 212 in FIG. 2.

The client device makes a determination as to whether the predefined location for the tag extracted from the embedded watermark matches the location data corresponding to the current location of the client device (step 614). If the client device determines that the predefined location for the tag extracted from the embedded watermark does not match the location data corresponding to the current location of the client device, no output of step 614, then the client device sends a message to a server device, such as server 104 in FIG. 1, indicating that the predefined location for the tag extracted from the embedded watermark does not match the location data corresponding to the current location of the client device and requests content associated with the scanned tag image (step 616). Thereafter, the process proceeds to step 620. If the client device determines that the predefined location for the tag extracted from the embedded watermark does match the location data corresponding to the current location of the client device, yes output of step 614, then the client device sends a confirmation to the server device indicating that the predefined location for the tag extracted from the embedded watermark does match the location data corresponding to the current location of the client device and requests the content associated with the scanned tag image (step 618).

Subsequently, the client device makes a determination as to whether the client device received the content associated with the scanned tag image from the server device (step 620). If the client device determines that the client device did receive the content associated with the scanned tag image from the server device, yes output of step 620, then the client device displays the content associated with the scanned tag image in a display device associated with the client device, such as display 218 in FIG. 2 (step 622) and the process terminates thereafter. If the client device determines that the client device did not receive the content associated with the scanned tag image from the server device, no output of step 620, then the client device makes a determination as to whether the client device received a content not found message from the server device (step 624). If the client device determines that the client device did receive a content not found message from the server device, yes output of step 624, then the client device displays the content not found message in the display device associated with the client device (step 626) and the process terminates thereafter.

If the client device determines that the client device did not receive a content not found message from the server device, no output of step 624, then the process proceeds to step 628. Returning again to step 608, if the client device determines that the scanned tag image does not include an embedded watermark that identifies a predefined location for the tag, no output of step 608, then the client device sends a request to the server device for the content associated with the scanned tag image (step 628). Thereafter, the process returns to step 620 where the client device determines whether the content associated with the scanned tag image was received.

Figure 7B:
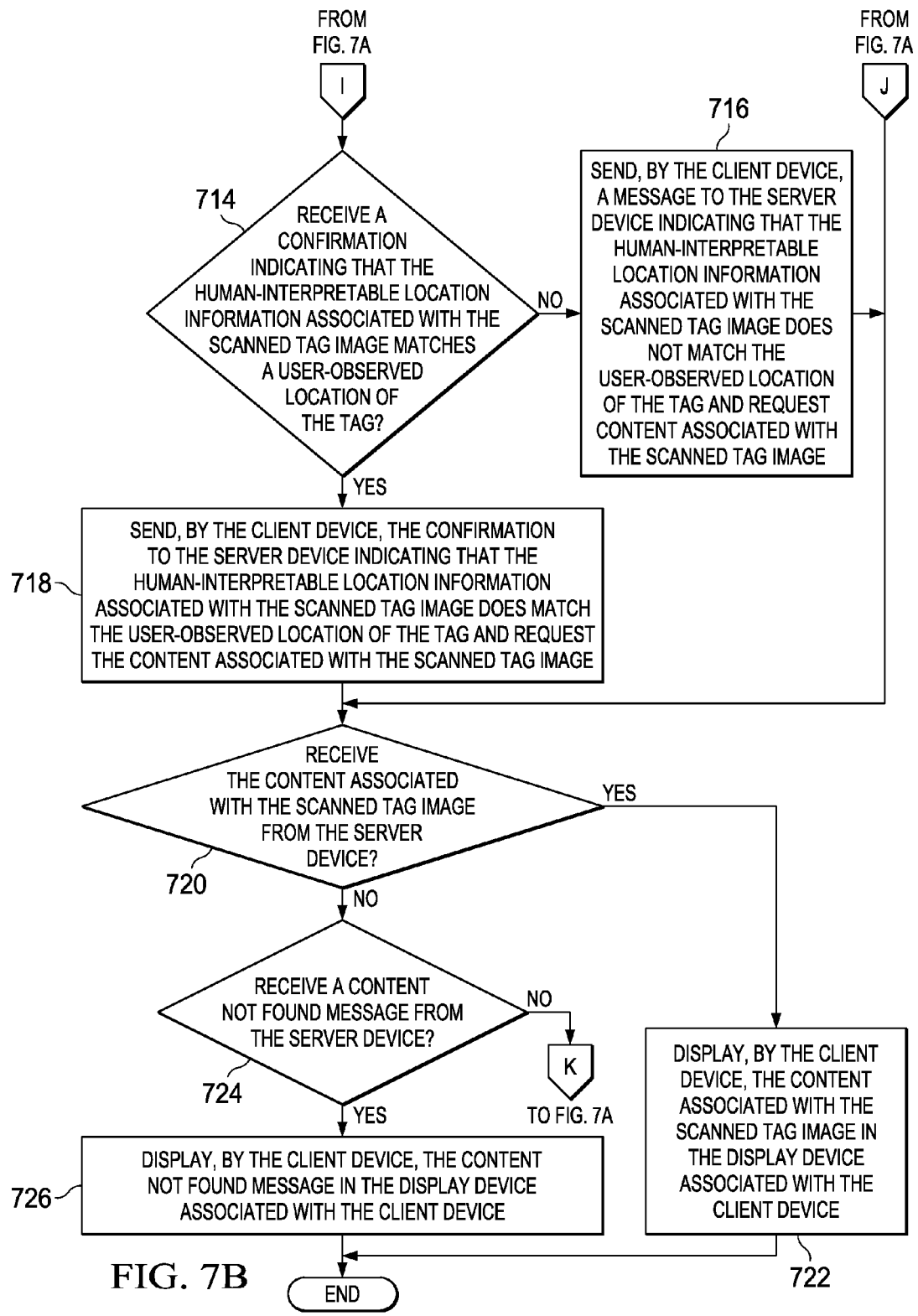

With reference now to FIG. 7A and FIG. 7B, a flowchart illustrating an alternative process for a client device is shown in accordance with an illustrative embodiment. The process shown in FIGS. 7A and 7B may be implemented in a client device, such as, for example, client device 110 in FIG. 1. Also, the client device may be implemented in a data processing system, such as data processing system 200 in FIG. 2.

The process begins when the client device receives an input to scan a tag associated with an object (step 702). The tag may be, for example, tag 408 in FIG. 4. After receiving the input to scan the tag associated with the object in step 702, the client device scans the tag associated with the object using a tag scanner device to generate a scanned tag image (step 704). The tag scanner device may be, for example, tag scanner device 220 in FIG. 2.

Subsequently, the client device reads the scanned tag image using the tag reader application (step 706). Further, the client device requests human-interpretable location information associated with the scanned tag image from a server device, such as server 104 in FIG. 1 (step 708). Afterward, the client device makes a determination as to whether the client device received the human-interpretable location information associated with the scanned tag image from the server device (step 710). If the client device determines that the client device did receive the human-interpretable location information associated with the scanned tag image from the server device, yes output of step 710, then the client device displays the human-interpretable location information associated with the scanned tag image in a display device associated with the client device, such as display 218 in FIG. 2 (step 712).

Furthermore, the client device makes a determination as to whether the client device received a confirmation indicating that the human-interpretable location information associated with the scanned tag image matches a user-observed location of the tag (step 714). If the client device determines that the client device did not receive a confirmation indicating that the human-interpretable location information associated with the scanned tag image matches a user-observed location of the tag, no output of step 714, then the client device sends a message to the server device indicating that the human-interpretable location information associated with the scanned tag image does not match the user-observed location of the tag and requests content associated with the scanned tag image (step 716). Thereafter, the process proceeds to step 720. If the client device determines that the client device did receive a confirmation indicating that the human-interpretable location information associated with the scanned tag image matches a user-observed location of the tag, yes output of step 614, then the client device sends the confirmation to the server device indicating that the human-interpretable location information associated with the scanned tag image does match the user-observed location of the tag and requests the content associated with the scanned tag image (step 718).

Subsequently, the client device makes a determination as to whether the client device received the content associated with the scanned tag image from the server device (step 720). If the client device determines that the client device did receive the content associated with the scanned tag image from the server device, yes output of step 720, then the client device displays the content associated with the scanned tag image in the display device associated with the client device (step 722) and the process terminates thereafter. If the client device determines that the client device did not receive the content associated with the scanned tag image from the server device, no output of step 720, then the client device makes a determination as to whether the client device received a content not found message from the server device (step 724). If the client device determines that the client device did receive a content not found message from the server device, yes output of step 724, then the client device displays the content not found message in the display device associated with the client device (step 726) and the process terminates thereafter.

If the client device determines that the client device did not receive a content not found message from the server device, no output of step 724, then the process proceeds to step 728. Returning again to step 710, if the client device determines that the client device did not receive the human-interpretable location information associated with the scanned tag image from the server device, no output of step 710, then the client device sends a request to the server device for the content associated with the scanned tag image (step 728). Thereafter, the process returns to step 720 where the client device determines whether the content associated with the scanned tag image was received.

Moreover, it should be noted that in this alternative process for the client device shown in the example of FIG. 7, the client device may not be required to request the human-interpretable location information associated with the scanned tag image from the server device. In other words, the client device may have previously received the human-interpretable location information from the server device and stored this location information in a storage device associated with the client device, such as persistent storage 208 in FIG. 2. Alternatively, the client device may generate the human-interpretable location information associated with the scanned tag image from stored machine-readable representations of a predefined location for the tag. Consequently, the client device may perform the entire process shown in FIG. 7, itself, while in an offline mode.

Thus, illustrative embodiments provide a data processing system and computer program product for authenticating and verifying a location of a machine-readable tag scanned by a portable tag scanning device. The descriptions of the various illustrative embodiments have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A data processing system for verifying a location of a tag and authenticating the tag scanned by a client device, the data processing system comprising:

a bus system;

a storage device connected to the bus system, wherein the storage device stores computer readable program code; and a processor unit connected to the bus system, wherein the processor unit executes the computer readable program code to:

receive a request for content associated with the tag from the client device that scanned the tag using a customized tag reader application capable of scanning and interpreting an embedded watermark including supplemental data of a particular type of tag being scanned, wherein the tag is a machine-readable tag;

determine whether the client device read the embedded watermark within the tag, wherein the tag is digitally signed with a digital signature of a tag provider for tag authentication, and wherein the embedded watermark includes the supplemental data regarding a predefined location within a particular area for the tag, a unique identification number corresponding to the tag and an expiration date associated with the tag in addition to a normal payload of the tag, and wherein the embedded watermark also includes an additional digital signature to verify authenticity of the embedded watermark;

in response to a determination the client device read the embedded watermark within the tag, the tag was generated by an authorized entity and the additional digital signature verifies authenticity of the embedded watermark, determine whether location data was received in the request from the client device that scanned the tag;

in response to a determination the location data was received in the request from the client device that scanned the tag, wherein the client device extracted the predefined location within the particular area for the tag, using one of a customized tag reader and the customized tag reader application, determine using the location data whether a current location of the tag is the predefined location within the particular area for the tag based on comparing the location data received from the client device and the supplemental data regarding the predefined location within the particular area for the tag extracted from the embedded watermark within the tag by the client device;

determine whether a current date is greater than or equal to a predefined expiration date associated with the tag in response to determining that the current location of the tag is the predefined location within the particular area for the tag based on comparing the location data received from the client device and the supplemental data regarding the predefined location within the particular area for the tag extracted from the embedded watermark within the tag by the client device; and send the content associated with the tag to the client device in response to determining that the current date is not greater than or equal to the expiration date associated with the tag, wherein the client device displays the content associated with a scanned tag image in a display device associated with the client device.

2. The data processing system of claim 1, wherein the processor unit further executes the computer readable program code to send information identifying the predefined location within the particular area for the tag scanned by the client device to the client device in response to determining that the location data was not received from the client device for confirmation by the client device indicating that the tag is located in the predefined location within the particular area for the tag.

3. The data processing system of claim 2, wherein the information identifying the predefined location within the particular area for the tag scanned by the client device is human-interpretable information regarding the predefined location within the particular area for the tag scanned by the client device.

4. The data processing system of claim 3, wherein the data processing system generates the human-interpretable information regarding the predefined location within the particular area for the tag scanned by the client device from machine-readable representations of the predefined location within the particular area for the tag.

5. The data processing system of claim 3, wherein the human-interpretable information regarding the predefined location within the particular area for the tag scanned by the client device is at least one of a textual description of where the tag scanned by the client device should be located, a verbal description of where the tag scanned by the client device should be located, a graphical depiction of where the tag scanned by the client device should be located, a picture of where the tag scanned by the client device should be located, or a video of where the tag scanned by the client device should be located.

6. The data processing system of claim 2, wherein the processor unit further executes the computer readable program code to determine whether the confirmation was received from the client device that the tag scanned by the client device is located in the predefined location within the particular area for the tag, wherein the confirmation is based on the information identifying the predefined location within the particular area for the tag sent to the client device.

7. The data processing system of claim 6, wherein the processor unit further executes the computer readable program code to send an alert message to personnel associated with the predefined location within the particular area for the tag indicating that the current location of the tag is misplaced and send a tag content not found message to the client device via a network in response to determining that the confirmation was not received from the client device that the tag scanned by the client device is located in the predefined location within the particular area for the tag.

8. A computer program product stored on a computer readable storage device having computer readable program code encoded thereon that is executable by a data processing system for verifying a location of a tag and authenticating the tag scanned by a client device, the computer program product comprising:

computer readable program code for receiving a request for content associated with the tag from the client device that scanned the tag using a customized tag reader application capable of scanning and interpreting an embedded watermark including supplemental data of a particular type of tag being scanned, wherein the tag is a machine-readable tag;

computer readable program code for determining whether the client device read the embedded watermark within the tag, wherein the tag is digitally signed with a digital signature of a tag provider for tag authentication, and wherein the embedded watermark includes the supplemental data regarding a predefined location within a particular area for the tag, a unique identification number corresponding to the tag, and an expiration date associated with the tag in addition to a normal payload of the tag, and wherein the embedded watermark also includes an additional digital signature to verify authenticity of the embedded watermark;

computer readable program code in response to a determination the client device read the embedded watermark within the tag, the tag was generated by an authorized entity and the additional digital signature verifies authenticity of the embedded watermark, for determining whether location data was received in the request from the client device that scanned the tag and extracted the predefined location within the particular area for the tag contained in the embedded watermark;

computer readable program code in response to a determination the location data was received in the request from the client device that scanned the tag, wherein the client device extracted the predefined location within the particular area for the tag, using one of a customized tag reader and the customized tag reader application, for determining using the location data whether a current location of the tag is the predefined location within the particular area for the tag based on comparing the location data received from the client device and the supplemental data regarding the predefined location within the particular area for the tag extracted from the embedded watermark within the tag by the client device;

computer readable program code for determining whether a current date is greater than or equal to a predefined expiration date associated with the tag in response to determining that the current location of the tag is the predefined location within the particular area for the tag based on comparing the location data received from the client device and the supplemental data regarding the predefined location within the particular area for the tag extracted from the embedded watermark within the tag by the client device; and computer readable program code for sending the content associated with the tag to the client device in response to determining that the current date is not greater than or equal to the expiration date associated with the tag, wherein the client device displays the content associated with a scanned tag image in a display device associated with the client device.

9. The computer program product of claim 8 further comprising:

computer readable program code for sending information identifying the predefined location within the particular area for the tag scanned by the client device to the client device in response to determining that the location data was not received from the client device for confirmation by the client device indicating that the tag is located in the predefined location within the particular area for the tag.

10. The computer program product of claim 9, wherein the information identifying the predefined location within the particular area for the tag scanned by the client device is human-interpretable information regarding the predefined location within the particular area for the tag scanned by the client device.

11. The computer program product of claim 10, wherein computer readable program code further comprises computer readable program code for the data processing system to generate the human-interpretable information regarding the predefined location within the particular area for the tag scanned by the client device from machine-readable representations of the predefined location within the particular area for the tag.

12. The computer program product of claim 10, wherein the human-interpretable information regarding the predefined location within the particular area for the tag scanned by the client device is at least one of a textual description of where the tag scanned by the client device should be located, a verbal description of where the tag scanned by the client device should be located, a graphical depiction of where the tag scanned by the client device should be located, a picture of where the tag scanned by the client device should be located, or a video of where the tag scanned by the client device should be located.

13. The computer program product of claim 9 further comprising:
computer readable program code for determining whether the confirmation was received from the client device that the tag scanned by the client device is located in the predefined location within the particular area for the tag, wherein the confirmation is based on the information identifying the predefined location within the particular area for the tag sent to the client device.

14. The computer program product of claim 13 further comprising:
computer readable program code for sending an alert message to personnel associated with the predefined location within the particular area for the tag indicating that the current location of the tag is misplaced and sending a tag content not found message to the client device via a network in response to determining that the confirmation was not received from the client device that the tag scanned by the client device is located in the predefined location within the particular area for the tag.

15. The computer program product of claim 8 further comprising:
computer readable program code for sending an alert message to personnel associated with the predefined location within the particular area for the tag indicating that the tag is expired in response to determining that the current date is greater than or equal to the expiration date associated with the tag scanned by the client device.

16. A data processing system for verifying a location of a tag and authenticating the tag scanned by the data processing system, the data processing system comprising:
a bus system;
a display device connected to the bus system;
a storage device connected to the bus system, wherein the storage device stores computer readable program code; and
a processor unit connected to the bus system, wherein the processor unit executes the computer readable program code to:
extract a predefined location, for the tag, from an embedded watermark contained within the tag, using one of a customized tag reader and a customized tag reader application, wherein the tag is digitally signed with a digital signature of a tag provider, and wherein the embedded watermark includes supplemental data of a particular type of tag being scanned including the predefined location within a particular area for the tag, a unique identification number corresponding to the tag, and an expiration date associated with the tag in addition to a payload of the tag, and wherein the embedded watermark also includes an additional digital signature to verify authenticity of the embedded watermark;
compare the predefined location within the particular area for the tag extracted from the embedded watermark with location data corresponding to a current location of the data processing system in response to a determination that the tag was generated by an authorized entity and the additional digital signature verifies authenticity of the embedded watermark;
send an automatic confirmation to a server device indicating that the predefined location within the particular area for the tag extracted from the embedded watermark does match the location data corresponding to the current location of the data processing system in response to determining that the predefined location within the particular area for the tag extracted from the embedded watermark matches the location data corresponding to the current location of the data processing system;
display human-interpretable location information identifying the predefined location within the particular area of the tag scanned by the data processing system on a display of the data processing system;
determine that a manual confirmation was received by the data processing system via an input on the display of the data processing system indicating that the displayed human-interpretable location information identifying the predefined location within the particular area of the tag scanned by the data processing system matches a user-observed location of the tag to verify that the current location of the tag is the predefined location within the particular area for the tag;
send the manual confirmation to the server device indicating that the displayed human-interpretable location information identifying the predefined location within the particular area of the tag matches the user-observed location of the tag; and
request content associated with the tag from the server device.

17. The data processing system of claim 16, wherein the processor unit further executes the computer readable program code to:
determine that the manual confirmation was not received by the data processing system via the input on the display of the data processing system indicating that the displayed human-interpretable location information identifying the predefined location within the particular area of the tag scanned by the data processing system matches the user-observed location of the tag; and
send a message to the server device indicating that the displayed human-interpretable location information identifying the predefined location within the particular area of the tag scanned by the data processing system does not match the user-observed location of the tag.

18. The data processing system of claim 16, wherein the location data corresponding to the current location of the data processing system is global positioning system coordinates of the data processing system obtained from a global positioning system unit located in the data processing system, and wherein the data processing system generates the human-interpretable location information associated with the tag from a machine-readable representation of the predefined location within the particular area for the tag.

19. A computer program product stored on a computer readable storage device having computer readable program code encoded thereon that is executable by a data processing system for verifying a location of a tag and authenticating the tag scanned by the data processing system, the computer program product comprising:
computer readable program code for extracting a predefined location within a particular area for the tag from an embedded watermark contained within the tag, using one of a customized tag reader and a customized tag reader application, wherein the embedded watermark includes supplemental data of a particular type of tag being scanned including the predefined location within the particular area for the tag, a unique identification number corresponding to the tag, and an expiration date associated with the tag in addition to a payload of the tag, and wherein the tag is a machine-readable tag that is digitally signed with a digital signature of a tag provider, and wherein the embedded watermark also includes an additional digital signature to verify authenticity of the embedded watermark;

computer readable program code for comparing the predefined location within the particular area for the tag extracted from the embedded watermark with location data corresponding to a current location of the data processing system in response to a determination that the tag was generated by an authorized entity and the additional digital signature verifies authenticity of the embedded watermark;

computer readable program code for sending an automatic confirmation to a server device indicating that the predefined location within the particular area for the tag extracted from the embedded watermark does match the location data corresponding to the current location of the data processing system in response to determining that the predefined location within the particular area for the tag extracted from the embedded watermark matches the location data corresponding to the current location of the data processing system;

computer readable program code for displaying human-interpretable location information identifying the predefined location within the particular area of the tag scanned by the data processing system on a display of the data processing system;

computer readable program code for determining that a manual confirmation was received by the data processing system via an input on the display of the data processing system indicating that the displayed human-interpretable location information identifying the predefined location within the particular area of the tag scanned by the data processing system matches a user-observed location of the tag to verify that the current location of the tag is the predefined location within the particular area for the tag;

computer readable program code for sending the manual confirmation to the server device indicating that the displayed human-interpretable location information identifying the predefined location within the particular area of the tag matches the user-observed location of the tag; and computer readable program code for requesting content associated with the tag from the server device.

20. The computer program product of claim 19 further comprising:

computer readable program code for determining that the manual confirmation was not received by the data processing system via the input on the display of the data processing system indicating that the displayed human-interpretable location information identifying the predefined location within the particular area of the tag scanned by the data processing system matches the user-observed location of the tag; and computer readable program code for sending a message to the server device indicating that the displayed human-interpretable location information identifying the predefined location within the particular area of the tag scanned by the data processing system does not match the user-observed location of the tag.

21. The computer program product of claim 19, wherein the location data corresponding to the current location of the data processing system is global positioning system coordinates of the data processing system obtained from a global positioning system unit located in the data processing system, and wherein the data processing system generates the human-interpretable location information associated with the tag from a machine-readable representation of the predefined location within the particular area for the tag.

* * * * *